(12) United States Patent
Zhang et al.

(10) Patent No.: US 11,162,882 B2
(45) Date of Patent: Nov. 2, 2021

(54) INTEGRAL CLAMPING STEEL STRAND DRAWING TEST APPARATUS, AND METHOD FOR USING SAME

(71) Applicant: China University of Mining and Technology, Jiangsu (CN)

(72) Inventors: Nong Zhang, Xuzhou (CN); Zhengzheng Xie, Xuzhou (CN); Junyao Zhou, Xuzhou (CN); Zhe Xiang, Xuzhou (CN); Xinyue Li, Xuzhou (CN)

(73) Assignee: China University of Mining And Technology

( * ) Notice: Subject to any disclaimer, the term of this patent is extended or adjusted under 35 U.S.C. 154(b) by 0 days.

(21) Appl. No.: 16/607,351

(22) PCT Filed: Sep. 13, 2018

(86) PCT No.: PCT/CN2018/105353
§ 371 (c)(1),
(2) Date: Oct. 22, 2019

(87) PCT Pub. No.: WO2019/119898
PCT Pub. Date: Jun. 27, 2019

(65) Prior Publication Data
US 2020/0319069 A1    Oct. 8, 2020

(30) Foreign Application Priority Data
Dec. 18, 2017    (CN) .......................... 201711363808.6

(51) Int. Cl.
*G01N 3/10*    (2006.01)
*B21C 1/02*    (2006.01)
*G01N 3/04*    (2006.01)

(52) U.S. Cl.
CPC ................. *G01N 3/10* (2013.01); *B21C 1/02* (2013.01); *G01N 3/04* (2013.01);
(Continued)

(58) Field of Classification Search
CPC .. G01N 3/10; G01N 3/04; G01N 3/08; G01N 3/02; G01N 2203/0017; G01N 2203/0048;
(Continued)

(56) References Cited

U.S. PATENT DOCUMENTS

2017/0307492 A1    10/2017    Ott

FOREIGN PATENT DOCUMENTS

CN    201673089 U    12/2010
CN    102323144 A    1/2012
(Continued)

*Primary Examiner* — Jonathan M Dunlap
(74) *Attorney, Agent, or Firm* — Morriss O'Bryant; Compagni Cannon, PLLC.

(57) ABSTRACT

Disclosed are an integral clamping steel strand drawing test apparatus, and a method for using same, wherein same are suitable for use in a steel strand mechanical property test. The apparatus comprises a rectangular lower base (13) and a rectangular upper base (14), with a hydraulic telescopic mechanism being provided between the lower base (13) and the upper base (14), the hydraulic telescopic mechanism being provided with an integral clamping mechanism, a steel strand test piece (4) to be tested being provided in the integral clamping mechanism, the steel strand test piece (4) to be tested being provided with a plurality of binding protective devices (2), and a safety protection door (16) being provided outside the hydraulic telescopic mechanism. During a steel strand drawing test, the property of a steel strand itself is fully brought into play, and the integrity of the steel strand test piece (4) is maintained, thereby being able to accurately reflect various mechanical properties of the (Continued)

drawn steel strand while preventing damage to the device and injuring an operator caused by a fracture in a single strand or a plurality of strands of the steel strand during the test. The device is simple and easy to operate, and has good practicability and promotional and application value.

7 Claims, 5 Drawing Sheets

(52) U.S. Cl.
CPC ............... *G01N 2203/0017* (2013.01); *G01N 2203/0048* (2013.01); *G01N 2203/028* (2013.01); *G01N 2203/0411* (2013.01)

(58) Field of Classification Search
CPC ..... G01N 2203/028; G01N 2203/0411; G01N 2203/0423; B21C 1/02
See application file for complete search history.

(56) References Cited

FOREIGN PATENT DOCUMENTS

| | | |
|---|---|---|
| CN | 204575449 U | 8/2015 |
| CN | 206583692 U | 10/2017 |
| CN | 108088748 A | 5/2018 |

D—D

INTEGRAL CLAMPING STEEL STRAND DRAWING TEST APPARATUS, AND METHOD FOR USING SAME

CROSS REFERENCE TO RELATED APPLICATIONS

This application is a U.S. nationalization of International Application No. PCT/CN2018/105353, filed Sep. 13, 2018, which claims priority to Chinese Patent Application No. 201711363808.6, filed Dec. 18, 2017, the contents of both applications being incorporated herein, by reference, in their entirety.

I. TECHNICAL FIELD

The present invention relates to an integrally clamped steel strand drawing test apparatus and method for using the apparatus, particularly suitable for testing of mechanical properties of steel strands.

II. BACKGROUND ART

In the sinking and driving engineering, steel strand materials such as anchor cables play a key role in achieving safe and efficient mining. Before using steel strands, the mechanical properties of the materials need to be tested in an all-round way.

The existing steel strand drawing test apparatuses cannot integrally clamp the steel strands. During the drawing test, steel strands are clamped unidirectionally or on both sides, so the steel strands are wholly subjected to uneven force and a splitting phenomenon occurs. When the anchor cable is split, the drawing will cause a splitting of the anchor cable in a larger area, breaking the integrity of the steel strands, which will cause a great error for the test results, and then it cannot be used to guide the field practices. In addition, during the test, only glass fiber reinforced plastics are used for the protection apparatus, which is less protective to the instrument itself. Therefore, it is very possible to produce a large damage to the experimental apparatus due to the break of a single-strand steel strand.

With the large-scale and mechanization of modern coal mines and the current speedy-drivage coal mining methods, steel strands such as anchor cables are required to be used more frequently, however, at present, there is still lack of an integrally clamped steel strand drawing test apparatus and method for using the apparatus.

III. CONTENTS OF THE INVENTION (SUMMARY)

In order to overcome the drawbacks of prior art, the present invention provides an integrally clamped steel strand drawing test apparatus and a method for using the apparatus, which are simple in structure, convenient in use and good in test effect.

For the foregoing technical object, the present invention provides an integrally clamped steel strand drawing test device, including a rectangular bottom seat and a rectangular top seat, a hydraulic telescopic mechanism is disposed between the bottom seat and the top seat, an integral holding mechanism is disposed on the hydraulic telescopic mechanism, a steel strand sample to be tested is disposed in the integral holding mechanism, a plurality of restraining protection apparatuses are disposed on the steel strand sample to be tested, and a safety protection door is disposed outside the hydraulic telescopic mechanism;

The hydraulic telescopic mechanism includes four hydraulic cylinders interconnected with four corners of bottom seat and the top seat;

The holding mechanism includes two block clamping apparatuses disposed oppositely up and down, disposed on the upper piston rod and the lower piston cylinder of the four hydraulic cylinders respectively;

The restraining protection apparatus includes a plurality of sets of support baffles, each set of support baffles includes two support baffles disposed in a cross, and an elastic rubber portion is disposed in the middle of the support baffles, a fixed thread and a sliding blocking-wheel set are disposed at two ends of each support baffle respectively. The fixed thread and sliding blocking-wheel set of each of the two support baffles are diagonally disposed on four hydraulic cylinders respectively to form an "X" connection, wherein the fixed thread of the support baffle is fixedly connected to the hydraulic column of the corresponding hydraulic cylinder, ensuring effective retracting and release of the support baffle. The sliding blocking-wheel set of the support baffle is slidably connected with the sliding crossheading embedded in the hydraulic column of the corresponding hydraulic cylinder, thus realizing the retracting and release of restraining protection device by the sliding of the sliding blocking-wheel set, an elastic rubber portion is disposed in the middle of the support baffle, and the steel strand sample to be tested is disposed in the elastic rubber portion, and the elastic rubber portion prevents the collision of the steel strand sample to be tested with the support baffle to cause secondary damage when the steel strand is broken.

The block clamping device includes four hexahedral blocks for holding the steel strand sample to be tested, and the four hexahedral blocks are combined into a cube, and a circular aperture is formed in the middle thereof to fix the steel strand sample to be tested.

The hexahedral block includes a front end block-shaped holder and a tail end block-shaped holder, and the front end block-shaped holder is internally provided with a hydraulic jack and connected to the tail end block-shaped holder via the internal hydraulic jack, during the elongation of the hydraulic jack, the front end block-shaped holder makes the tail end block-shaped holder move in the front and upward direction along the slope of the front end block-shaped holder in the case of constant horizontal position, clamp the steel strand sample to be tested, and also makes the tail end block-shaped holder move in the rear and downward direction along the slope of the front end block-shaped holder, loose the aperture and release the steel strand sample to be tested; the front end block-shaped holder is a heptahedral structure, the tail end block-shaped holder is a pentahedral structure, the tail end block-shaped holder is disposed with a quarter-arc surface on the inner surface, and a friction rubber gasket is disposed on the arc surface, to form a circular aperture together with the ends of other three holders and achieve the clamping of the steel strand; a sensing apparatus is disposed on the friction rubber gasket of the tail end block-shaped holder, to collect the changes in data of drawing force of anchor cables;

The circular hole of the block clamping portion has an aperture of 20 to 100 mm, and the running stroke of the block clamping portion is 0 to 2 m.

The aperture of restraining protection device is designed to be 35 to 110 mm, and the elastic rubber material has a thickness of 8 to 12 mm.

An integrally clamped steel strand drawing test method, including the following steps:

a. Adjusting the height of the block clamping portion according to the length of the steel strand sample to be tested, such that the height of the block clamping apparatus' is adapted to the height of the steel strand sample to be tested and the steel strand sample to be tested is naturally straightened;

b. Opening the restraining protection device to adjust the anchor cable sample to be tested to pass through the restraining protection apparatus, and matching and fixing the thread end with the hydraulic cylinder of the corresponding hydraulic column using a matching screw, to stabilize the restraining protection apparatus;

c. After the steel strand sample to be tested passes through elastic rubber portions in a plurality of restraining protection apparatuses sequentially, adjusting the upper and lower block clamping apparatuses to evenly tighten both ends of the anchor cable sample, and at the same time, starting to lift four hydraulic cylinders to drive the upper block clamping mechanism disposed on the piston rod to lift upwards at a constant velocity, immobilizing the lower block clamping mechanism on the hydraulic cylinder piston cylinder, to carry out drawing of the steel strand sample, during the process, as the hydraulic rod of the hydraulic cylinder rises, the corresponding restraining protection apparatus also moves by the sliding blocking-wheel set, and at the same time, by a sensing device inside the friction rubber gasket at the end of the block holder, recording the parameter changes of mechanical properties of the steel strand sample, when the steel strand sample to be tested cannot withstand the tensile force and is broken, the restraining protection apparatus effectively prevents the safety hazard caused by breakage of the steel strand sample to be tested.

d. Descending the block clamping portion sequentially, opening the block clamping portion, immediately taking out the steel strand sample, then loosening the thread portion, lowering the restraining protection apparatus to take out the anchor cable sample to be tested, and completing the test.

The present invention can achieve the following beneficial effects:

(1) It enhances the overall effect of steel strand drawing experiments and fully exerts the integrity of the steel strand sample, and solves the problems of failure to test the overall performance of steel strands due to the splitting phenomenon thereof.

(2) It reduces the damage to the equipment caused by breaking of a single strand or multiple strands during the test, and provides protective measures for the safety of experimental personnel.

(3) It simplifies the test process without the manual tightening of steel strands, saving the test time and test process.

(4) The equipment is simple in structure, easy to operate, with high promotion and applicability.

In the process of the steel strand drawing test, by giving full play to the steel strand performance and maintaining the integrity of the steel strand sample, changes of the parameters of mechanical properties of steel strand samples can be accurately recorded. In addition, during the drawing experiments of steel strands, a plurality of restraining protection apparatuses are used, which can effectively avoid the harms to the equipment and personnel of steel strands due to elastic jumping caused by breaking of single-strand materials during the drawing process. In the present invention, in order not to affect the experimental effects and to achieve the risk avoidance effect for the restraining protection apparatus, telescopic swing arm type restraining rings are used and fixed on the left and right columns. This method can fully ensure the integrity of the anchor cables in the drawing experiments of steel strands, and effectively avoid the occurrence of harms to experimental facilities and personnel, having a positive effect in the test of various data and indexes of steel strands.

IV. DESCRIPTION OF DRAWINGS

In the figures: 1—hydraulic cylinder; 2—restraining protection apparatus; 3—block clamping mechanism; 4—anchor cable sample to be tested; 5—thread portion; 6—support baffle; 7—elastic rubber portion; 8—sliding blocking-wheel, 9—front end block-shaped holder, 10—tail end block-shaped holder, 11—hydraulic jack portion, 12—hexahedral block, 13—bottom seat, 14—top seat, 15—friction rubber gasket, 16—safety protection door, 17—sensing apparatus, 18—sliding crossheading.

V. EMBODIMENTS (DETAILED DESCRIPTION)

An embodiment of the present invention will be further described below with reference to the accompanying drawings.

Figure 1:
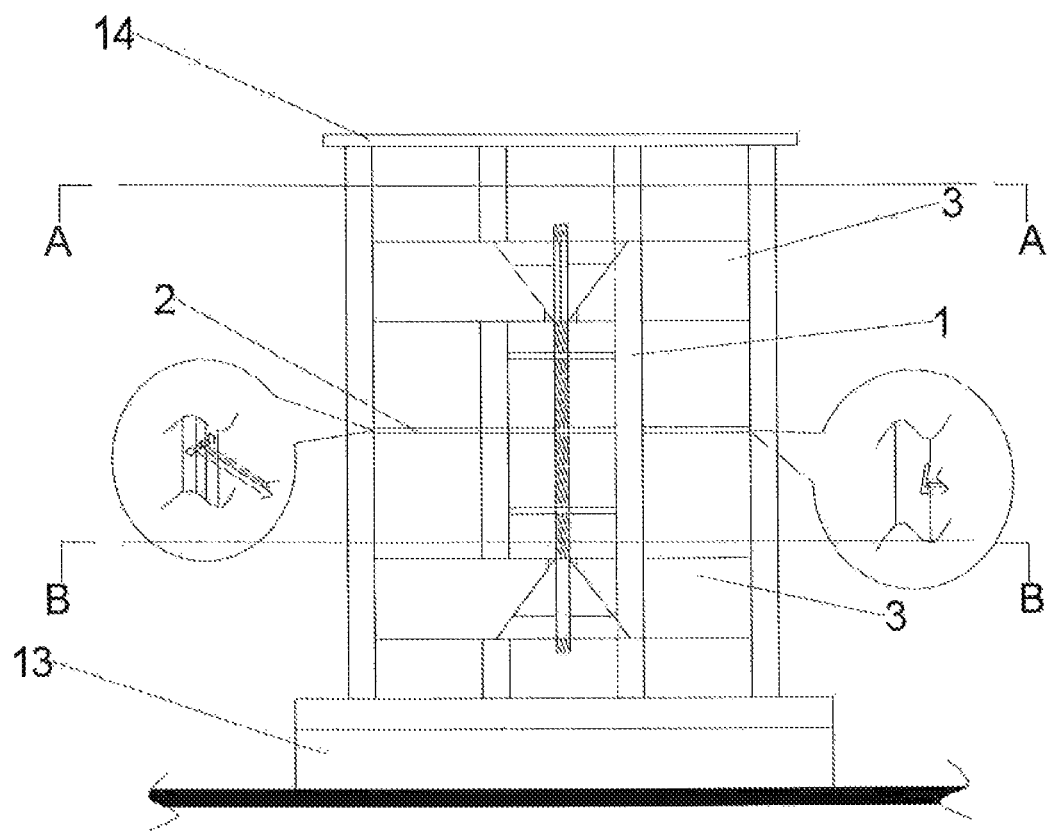
FIG. 1 is a schematic view of the overall structure of an integrally clamped anchor cable drawing apparatus.
Figure 2:
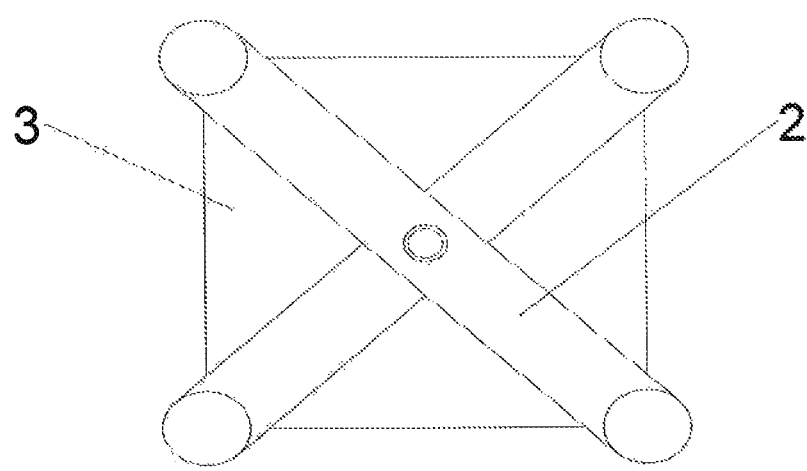
FIG. 2 is a schematic view showing the overall structure of an integrally clamped anchor cable drawing apparatus at A-A.
Figure 3:
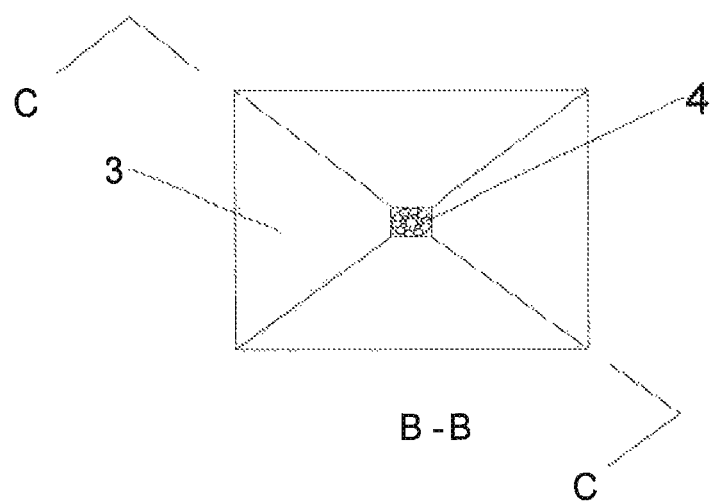
FIG. 3 is a schematic view showing the overall structure of an integrally clamped anchor cable drawing device at B-B.
Figure 4:
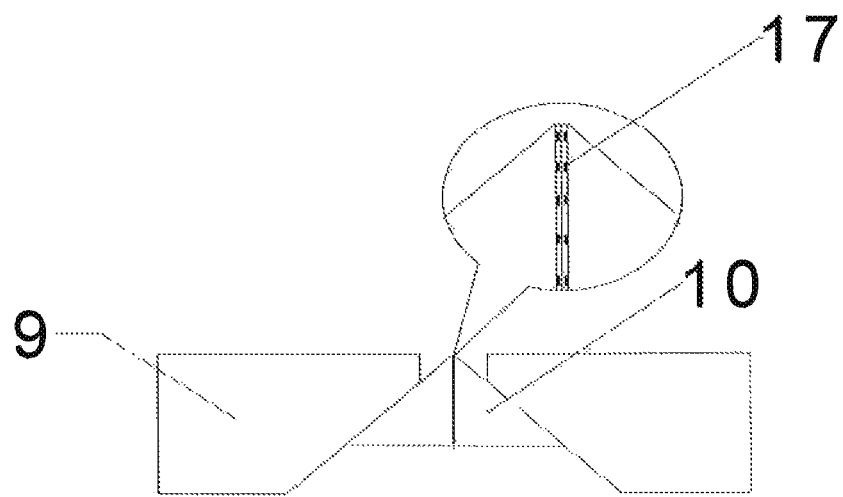
FIG. 4 is a cross-sectional view of a block clamping portion at C-C of an integrally clamped anchor cable drawing apparatus.
Figure 5:
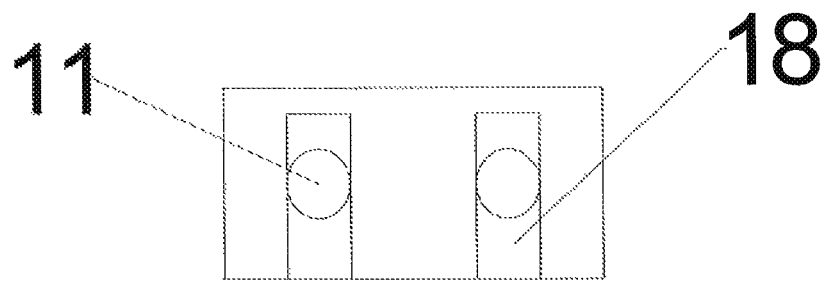
FIG. 5 is a structural diagram of a hydraulic hole and a hydraulic apparatus sliding crossheading in the front end of a block holder of an integrally clamped anchor cable drawing apparatus.
Figure 6:
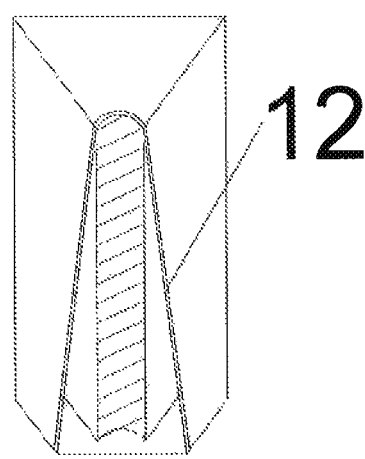
FIG. 6 is a schematic diagram of a hexahedral structure of a block holder portion of an integrally clamped anchor cable drawing apparatus.
Figure 7:
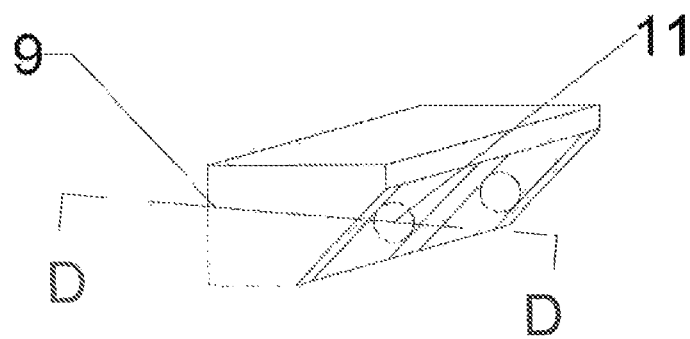
FIG. 7 is a schematic diagram of a front end structure of a block holder portion of an integrally clamped anchor cable drawing apparatus.
Figure 8:
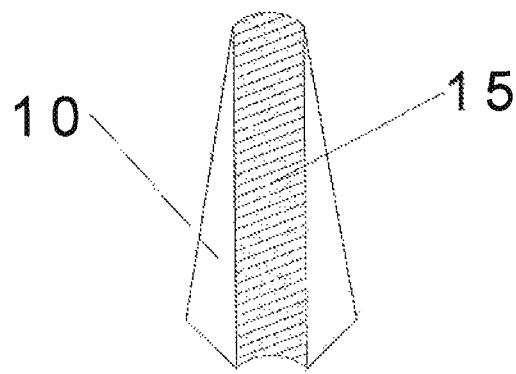
FIG. 8 is a schematic diagram of a tail end structure of a block holder portion of an integrally clamped anchor cable drawing apparatus.
Figure 9:
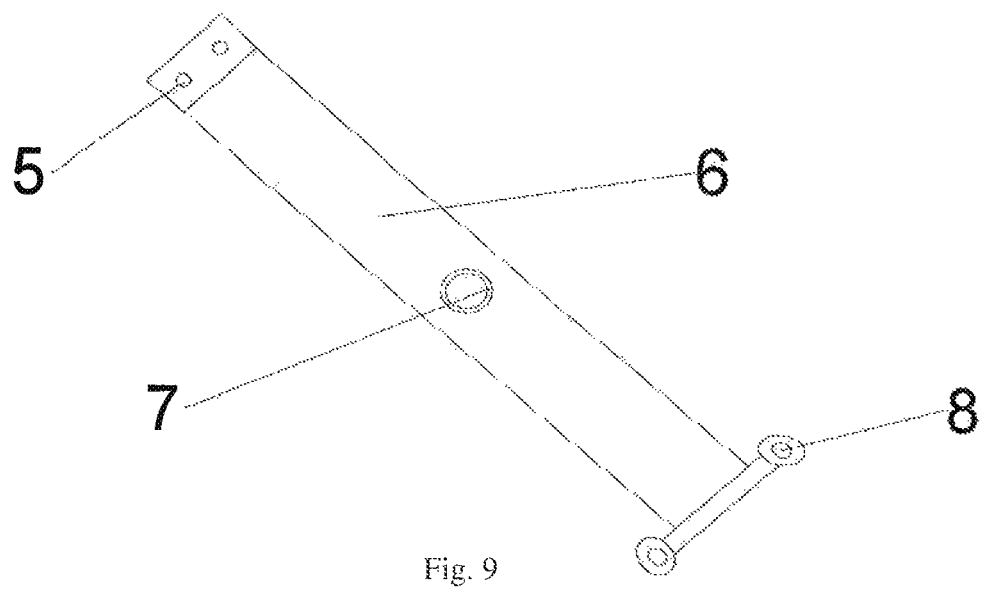
FIG. 9 is a structural schematic diagram of a restraining protection device of an integrally clamped anchor cable drawing apparatus.
Figure 13:
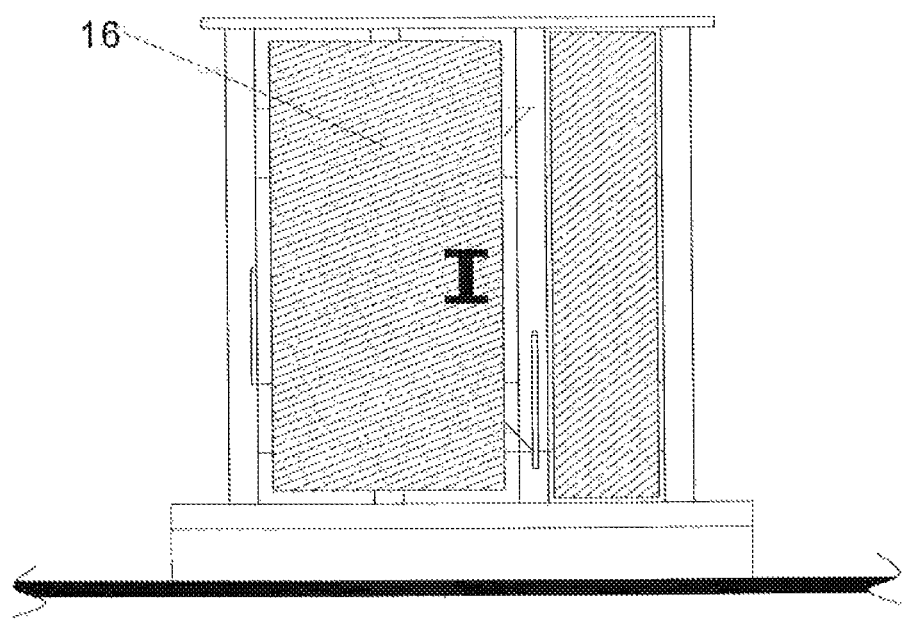
FIG. 13 is a schematic diagram of a tempered glass security door of an integrally clamped anchor cable drawing apparatus.

As shown in FIG. 1 and FIG. 2, in the present invention, an integrally clamped steel strand drawing test device, including: a rectangular bottom seat 13 and a rectangular top seat 14, a hydraulic telescopic mechanism is disposed between the bottom seat 13 and the top seat 14, an integral holding mechanism is disposed on the hydraulic telescopic mechanism, a steel strand sample to be tested 4 is disposed in the integral holding mechanism, a plurality of restraining protection apparatuses 2 are disposed on the steel strand sample to be tested 4, and a safety protection door 16 is disposed outside the hydraulic expansion mechanism as shown in FIG. 13;

The hydraulic telescopic mechanism includes four hydraulic cylinders 1 interconnected with four corners of the bottom seat 13 and the top seat 14;

The holding mechanism includes two block clamping apparatuses 3 disposed oppositely up and down, disposed on the upper piston rod and the lower piston cylinder of the four hydraulic cylinders 1 respectively;

As shown in FIG. 3, the aperture of the restraining protection apparatus 2 is designed to be 35 to 110 mm, and the elastic rubber material has a thickness of 8 to 12 mm. As shown in FIG. 9, the restraining protection apparatus 2 includes a plurality of sets of support baffles 6, each set of support baffle 6 includes two support baffles 6 disposed in a cross, and an elastic rubber portion 7 is disposed in the middle of the support baffle 6, a fixed thread 5 and a sliding blocking-wheel set 8 are disposed at two ends of the support baffle 6 respectively, the fixed thread 5 and sliding blocking-wheel set 8 of the two support baffles 6 are diagonally disposed on four hydraulic cylinders 1 respectively to form an "X" connection, wherein the fixed thread 5 of the support baffle 6 is fixedly connected to the hydraulic column of the corresponding hydraulic cylinder 1, ensuring effective retracting and release of the support baffle 6. As shown in FIG. 5, the sliding blocking-wheel set 8 of the support baffle 6 is slidably connected with the sliding crossheading 18 embedded in the hydraulic column of the corresponding hydraulic cylinder 1, and realizing the retracting and release of restraining protection apparatus 2 by the sliding of the sliding blocking-wheel set 8, an elastic rubber portion 7 is disposed in the middle of the support baffle 6, and the steel strand sample to be tested 4 is disposed in the elastic rubber portion 7, and the elastic rubber portion 7 prevents the collision of the steel strand sample to be tested 4 with the support baffle 6 to cause secondary damage when the steel strand is broken.

Figure 10:
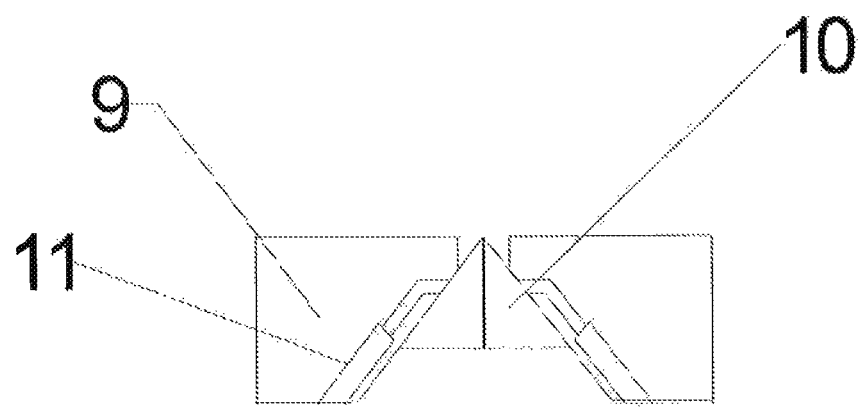
FIG. 10 is a schematic view of a hydraulic device portion of an integrally clamped anchor cable drawing apparatus.
Figure 11:
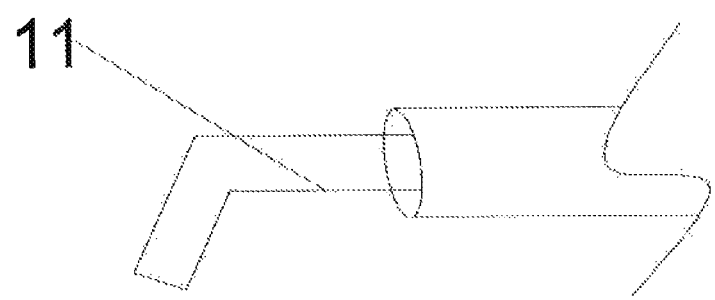
FIG. 11 is a schematic diagram of an internal hydraulic cylinder of an integrally clamped anchor cable drawing apparatus.
Figure 12:
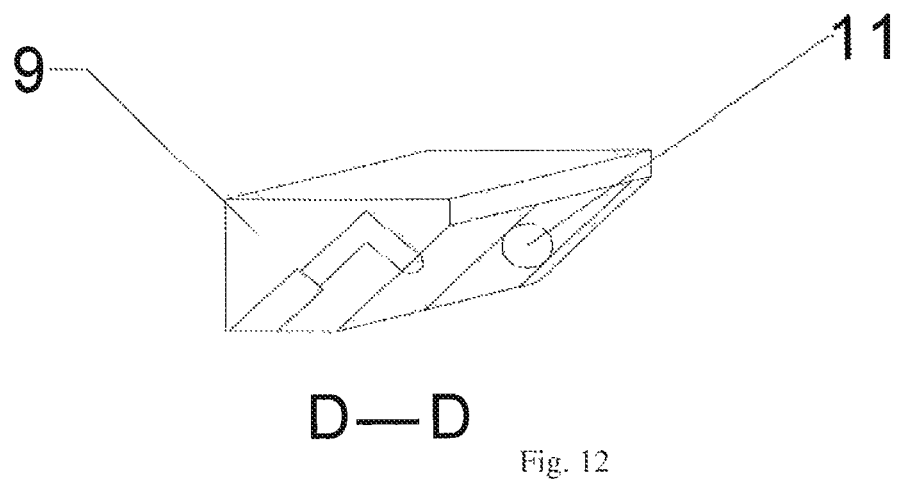
FIG. 12 is a D-D cross-sectional view of a tail end structure of a block clamping portion of an integrally clamped anchor cable drawing apparatus.

The block clamping device 3 includes four hexahedral blocks 12 for holding the steel strand sample to be tested 4, the circular hole of the block clamping portion 3 has an aperture of 20 to 100 mm, and the running stroke of the block clamping portion 3 is 0 to 2 m, and the four hexahedral blocks 12 are combined into a cube, and a circular aperture is formed in the middle thereof to fix the steel strand sample to be tested 4. As shown in FIG. 10, FIG. 11 and FIG. 12, the hexahedral block 12 includes a front end block-shaped holder 9 and a tail end block-shaped holder 10, and the front end block-shaped holder 9 is internally provided with a hydraulic jack 11 and connected to the tail end block-shaped holder 10 via an internal hydraulic jack 11, during the elongation of the hydraulic jack 11, the front end block-shaped holder 9 makes the tail end block-shaped holder 10 move in the front and upward direction along the slope of the front end block-shaped holder 9 in the case of constant horizontal position, clamp the steel strand sample to be tested 4, and also makes the tail end block-shaped holder 10 move in the rear and downward direction along the front end block-shaped holder 9, loose the aperture and release the steel strand sample to be tested 4; as shown in FIG. 4, FIG. 6, FIG. 7 and FIG. 8, the front end block-shaped holder 9 is a heptahedral structure, the tail end block-shaped holder 10 is a pentahedral structure, the tail end block-shaped holder 10 is disposed with a quarter-arc surface on the inner surface, and a friction rubber gasket 15 is disposed on the arc surface, to form a circular aperture together with the ends of other three holders and achieve the clamping of the steel strand; a sensing apparatus 17 is disposed on the friction rubber gasket 15 of the tail end block-shaped holder 10, to collect the changes in data of drawing force of anchor cables;

A test method using the steel strand drawing test apparatus, including the following steps:

a. Adjusting the height of the block clamping portion 3 according to the length of the steel strand sample to be tested 4, such that the height of the block clamping apparatus 3 is adapted to the height of the steel strand sample to be tested 4 and the steel strand sample to be tested 4 is naturally straightened;

b. Opening the restraining protection apparatus 2 to adjust the anchor cable sample to be tested 4 to pass through the restraining protection apparatus 2, and fixing the thread end with the corresponding hydraulic cylinder 1 of the hydraulic column using a matching screw, to stabilize the restraining protection apparatus 2;

c. After the steel strand sample to be tested 4 passes through the elastic rubber portions 7 in a plurality of restraining protection apparatuses 2 sequentially, adjusting the upper and lower block clamping apparatuses to evenly tighten both ends of the anchor cable sample 4, and at the same time, starting to lift four hydraulic cylinders 1 to drive the upper block clamping mechanism 3 disposed on the piston rod to lift upwards at a constant velocity, immobilizing the lower block clamping mechanism 3 on the hydraulic cylinder 1 piston cylinder, to carry out drawing of the steel strand sample 4, during the process, as the hydraulic rod of the hydraulic cylinder 1 rises, the corresponding restraining protection apparatus 2 also moves by the sliding blocking-wheel set 8, and at the same time, by setting a sensing apparatus 17 inside the friction rubber gasket 15 at the end of the block holder 10, recording the parameter changes of mechanical properties of the steel strand sample to be tested 4, when the steel strand sample to be tested 4 cannot withstand the tensile force and is broken, the restraining protection apparatus 2 effectively prevents the safety hazard caused by breakage of the steel strand sample to be tested 4;

d. Descending the block clamping portion 3 sequentially, opening the block clamping portion 3, immediately taking out the steel strand sample, then loosening the thread portion 5, lowering the restraining protection apparatus 2 to take out the anchor cable sample to be tested 4, and completing the test.

The invention claimed is:

1. An integrally clamped steel strand drawing test apparatus, comprising:
    a rectangular bottom seat and a rectangular top seat, a hydraulic telescopic mechanism is disposed between the bottom seat and the top seat, an integral holding mechanism is disposed on the hydraulic telescopic mechanism, a steel strand sample to be tested is disposed in the integral holding mechanism, a plurality of restraining protection apparatuses are disposed on the steel strand sample to be tested, and a safety protection door is disposed outside the hydraulic expansion mechanism;

the hydraulic telescopic mechanism comprises four hydraulic cylinders interconnected with four corners of the bottom seat and the top seat;

the holding mechanism comprises two block clamping apparatuses disposed oppositely up and down, disposed on an upper piston rod and a lower piston cylinder of the four hydraulic cylinders respectively;

the restraining protection apparatus comprises a plurality of sets of support baffles, each set of support baffle comprises two support baffle disposed in a cross, and an elastic rubber portion is disposed in the middle of the support baffle, a fixed thread and a sliding blocking-wheel set are disposed at two ends of the support baffle respectively, the fixed thread and sliding blocking-wheel set of the two support baffles are diagonally disposed on the four hydraulic cylinders respectively to form an "X" connection, wherein the fixed thread of the support baffle is fixedly connected to a hydraulic column of the corresponding hydraulic cylinder, ensuring effective retracting and release of the support baffle, and the sliding blocking-wheel set of the support baffle is slidably connected with a sliding crossheading embedded in the hydraulic column of the corresponding hydraulic cylinder, and realizing the retracting and release of restraining protection device by the sliding of the sliding blocking-wheel set, and the steel strand sample to be tested is disposed in the elastic rubber portion, and the elastic rubber portion prevents the collision of the steel strand sample to be tested with the support baffle to cause secondary damage when the steel strand is broken.

2. The integrally clamped steel strand drawing test apparatus according to claim 1, wherein the block clamping apparatus comprises four hexahedral blocks for holding the steel strand sample to be tested, and the four hexahedral blocks are combined into a cube, and a circular aperture is formed in the middle thereof to fix the steel strand sample to be tested.

3. The integrally clamped steel strand drawing test apparatus according to claim 2, wherein the hexahedral block comprises a front end block-shaped holder and a tail end block-shaped holder, and the front end block-shaped holder is internally provided with a hydraulic jack and connected to the tail end block-shaped holder via the internal hydraulic jack, during an elongation of the hydraulic jack, the front end block-shaped holder makes the tail end block-shaped holder move in the front and upward direction along the slope of the front end block-shaped holder in the case of constant horizontal position, clamp the steel strand sample to be tested, and also makes the tail end block-shaped holder move in the rear and downward direction along the slope of the front end block-shaped holder, loose the aperture and release the steel strand sample to be tested; the front end block-shaped holder is a heptahedral structure, the tail end block-shaped holder is a pentahedral structure, the tail end block-shaped holder is disposed with a quarter-arc surface on the inner surface, and a friction rubber gasket is disposed on the arc surface, to form a circular aperture together with the ends of other three holders and achieve the clamping of the steel strand; a sensing apparatus is disposed on the friction rubber gasket of the tail end block-shaped holder, to collect the changes in data of drawing force of a steel strand being tested.

4. The integrally clamped steel strand drawing test apparatus according to claim 3, wherein the circular hole of the block clamping portion has an aperture of 20 to 100 mm, and the running stroke of the block clamping portion is 0 to 2 m.

5. The integrally clamped steel strand drawing test apparatus according to claim 2, wherein the circular hole of the block clamping portion has an aperture of 20 to 100 mm, and the running stroke of the block clamping portion is 0 to 2 m.

6. The integrally clamped steel strand drawing test apparatus according to claim 1, wherein the aperture of restraining protection apparatus is designed to be 35 to 110 mm, and the elastic rubber material has a thickness of 8 to 12 mm.

7. A test method using the integrally clamped steel strand drawing test apparatus of claim 1, comprising the following steps:

a. adjusting the height of the block clamping portion according to the length of the steel strand sample to be tested, such that the height of the block clamping apparatus is adapted to the height of the steel strand sample to be tested and the steel strand sample to be tested is naturally straightened;

b. opening the restraining protection apparatus to adjust the steel strand sample to be tested to pass through the restraining protection apparatus, and matching and fixing the thread end with the hydraulic cylinder of the corresponding hydraulic column using a matching screw, to stabilize the restraining protection apparatus;

c. after the steel strand sample to be tested passes through elastic rubber portions in a plurality of restraining protection apparatuses sequentially, adjusting the upper and lower block clamping apparatuses to evenly tighten both ends of the steel strand sample, and at the same time, starting to lift four hydraulic cylinders to drive the upper block clamping mechanism disposed on the upper piston rod to lift upwards at a constant velocity, immobilizing the lower block clamping mechanism on the hydraulic cylinder lower piston cylinder, to carry out drawing of the steel strand sample, during the process, as the hydraulic upper piston rod of the hydraulic cylinder rises, the corresponding restraining protection apparatus also moves by the sliding blocking-wheel set, and at the same time, by setting a sensing apparatus inside the friction rubber gasket at the end of the block holder, recording the parameter changes of mechanical properties of the steel strand sample, when the steel strand sample to be tested cannot withstand the tensile force and is broken, the restraining protection apparatus effectively prevents the safety hazard caused by breakage of the steel strand sample to be tested; and d. descending the block clamping portion sequentially, opening the block clamping portion, immediately taking out the steel strand sample, then loosening the thread portion, lowering the restraining protection apparatus to take out the steel strand sample to be tested, and completing the test.

* * * * *